US011310880B2

(12) United States Patent
Ramaiah et al.

(10) Patent No.: US 11,310,880 B2
(45) Date of Patent: Apr. 19, 2022

(54) LED BATTERY BACKUP LAMP

(71) Applicant: CONSUMER LIGHTING (U.S.), LLC, Norwalk, CT (US)

(72) Inventors: Raghu Ramaiah, Mentor, OH (US); James William Firis, South Euclid, OH (US); Morgan Lane McMahon, Cleveland, OH (US)

(73) Assignee: Savant Technologies LLC, East Cleveland, OH (US)

( * ) Notice: Subject to any disclaimer, the term of this patent is extended or adjusted under 35 U.S.C. 154(b) by 329 days.

(21) Appl. No.: 16/617,495

(22) PCT Filed: May 11, 2018

(86) PCT No.: PCT/US2018/032318
§ 371 (c)(1),
(2) Date: Nov. 26, 2019

(87) PCT Pub. No.: WO2018/217478
PCT Pub. Date: Nov. 29, 2018

(65) Prior Publication Data
US 2020/0113033 A1    Apr. 9, 2020

Related U.S. Application Data

(60) Provisional application No. 62/511,433, filed on May 26, 2017.

(51) Int. Cl.
*H05B 45/37* (2020.01)
*F21K 9/272* (2016.01)
(Continued)

(52) U.S. Cl.
CPC ............ *H05B 45/37* (2020.01); *F21K 9/272* (2016.08); *F21S 9/022* (2013.01); *F21V 23/003* (2013.01);
(Continued)

(58) Field of Classification Search
None
See application file for complete search history.

(56) References Cited

U.S. PATENT DOCUMENTS

| 4,751,398 A | 6/1988 | Ertz, III |
| 6,285,132 B1 | 9/2001 | Conley, III et al. |

(Continued)

FOREIGN PATENT DOCUMENTS

| EP | 2859645 A2 | 4/2015 |
| EP | 2916426 A1 | 9/2015 |

(Continued)

OTHER PUBLICATIONS

International Search Report and Written Opinion issued in connection with corresponding PCT Application No. PCT/US2018/032318 dated Sep. 27, 2018.

*Primary Examiner* — Alan B Cariaso
(74) *Attorney, Agent, or Firm* — Wood IP LLC

(57) ABSTRACT

An LED lamp includes a housing having an endcap, an optical portion, and components located within the housing, the components including a plurality of LED segments and a reconfiguration circuit configured to route LED segment electrical connections from a serial to a parallel mode, an LED driver circuit, a line sense circuit to detect presence/absence of AC line voltage, and a rechargeable battery connected to a boost driver circuit to provide electrical power to the LED light source in the absence of line voltage, and a control processor to monitor and control one or more of the plurality of components. The LED lamp configured to illuminate all LED segments irrespective of the presence or absence of the line voltage.

20 Claims, 8 Drawing Sheets

(51) Int. Cl.
*H05B 45/357* (2020.01)
*F21S 9/02* (2006.01)
*F21V 23/00* (2015.01)
*F21V 23/02* (2006.01)
*H02J 7/00* (2006.01)
*H02J 9/06* (2006.01)
*F21Y 115/10* (2016.01)
*H05B 45/345* (2020.01)
*H05B 45/38* (2020.01)

(52) U.S. Cl.
CPC ............ *F21V 23/02* (2013.01); *H02J 7/0031* (2013.01); *H02J 7/0047* (2013.01); *H02J 9/061* (2013.01); *H05B 45/357* (2020.01); *F21Y 2115/10* (2016.08); *H05B 45/345* (2020.01); *H05B 45/38* (2020.01)

(56) References Cited

U.S. PATENT DOCUMENTS

| | | |
|---|---|---|
| 8,192,039 B1 | 6/2012 | Moe et al. |
| 8,946,991 B2 | 2/2015 | Gordin |
| 9,414,469 B2 | 8/2016 | Chen et al. |
| 9,485,834 B2 | 11/2016 | Noguchi |
| 2010/0039794 A1 | 2/2010 | Ghanem et al. |
| 2010/0264737 A1 | 10/2010 | Chandler et al. |
| 2013/0127362 A1 | 5/2013 | Trainor et al. |
| 2015/0380983 A1 | 12/2015 | Chen et al. |
| 2016/0356472 A1* | 12/2016 | Liu ........................ F21V 23/06 |

FOREIGN PATENT DOCUMENTS

| | | | |
|---|---|---|---|
| WO | 2013182927 A2 | 12/2013 | |
| WO | 2015/122635 A1 | 8/2015 | |
| WO | WO-2015122635 A1 * | 8/2015 | ............. H05B 45/44 |
| WO | 2018/217478 A1 | 11/2018 | |

* cited by examiner

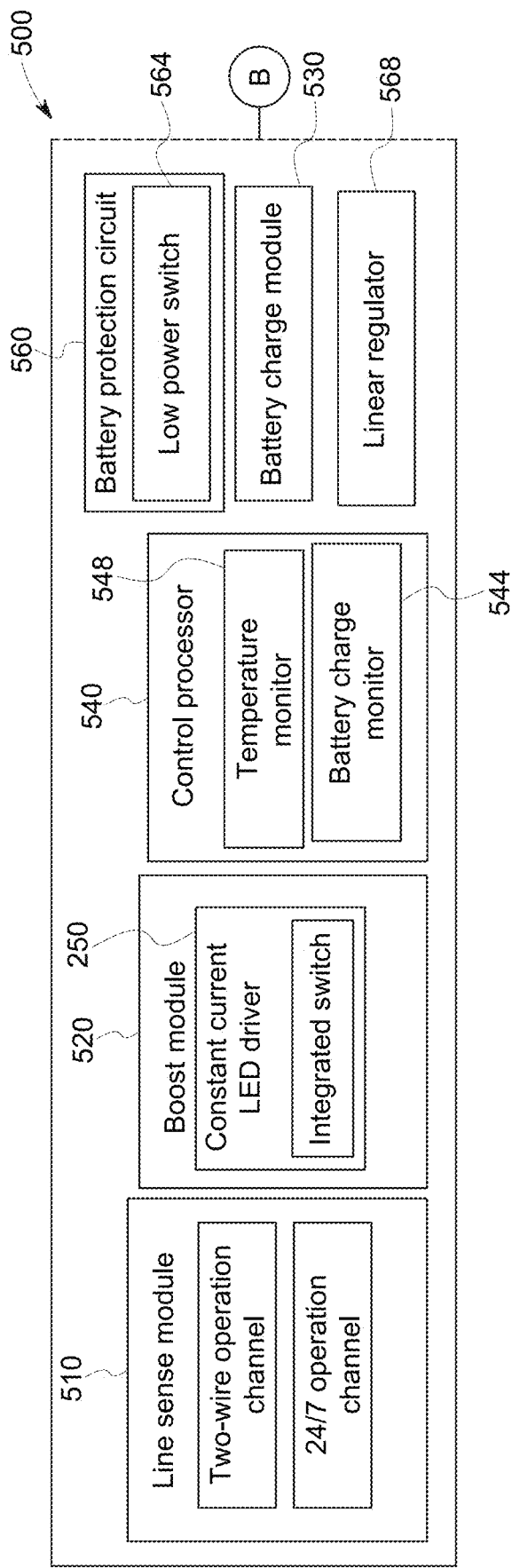
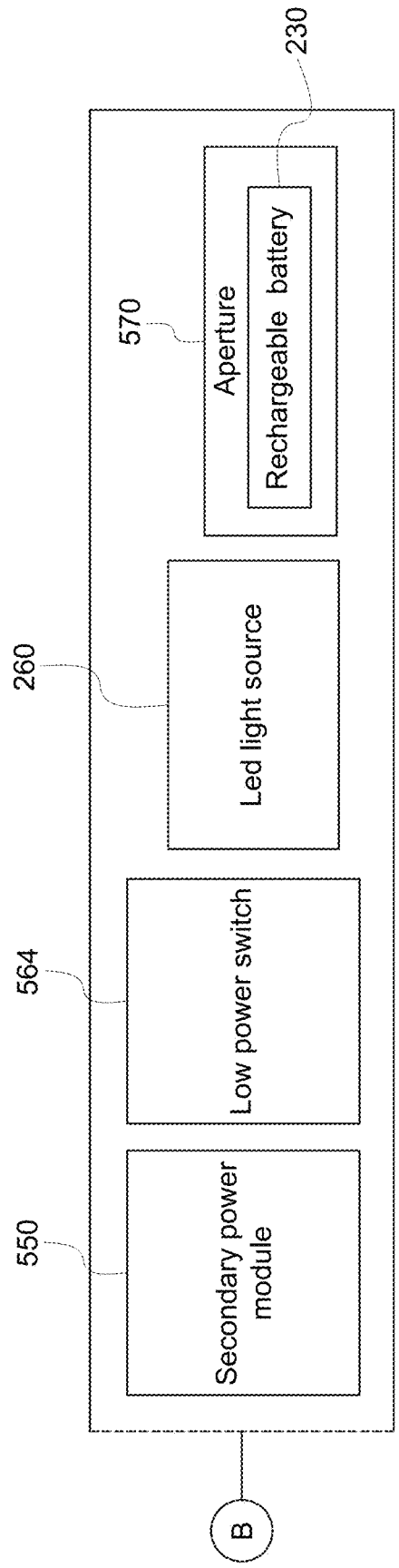
FIG. 5A
FIG. 5B

LED BATTERY BACKUP LAMP

FIELD

Embodiments of the present disclosure pertain to light emitting diodes (LED) battery-backup lamps.

BACKGROUND

There is an increasing trend to replace linear fluorescent lamps (LFL) with tubular LED tubular lighting assemblies. Typically, drivers for LED tubular lighting assemblies can be designed to work as a retrofit for many existing ballasts, so the expense incurred to the customer is minimized when replacing LFL tubes with LED tubular lighting assemblies.

FIG. 1 depicts a wiring diagram for conventional LFL emergency battery backup (EMBB) lighting system 100. The number of wires and connections needed for a conventional LFL EMBB system usually requires installation by a trained electrician. LFL EMBB system 100 includes fluorescent tubular lamp 100, rapid start ballast 120, and emergency ballast 130. The emergency ballast and the rapid start ballast are both connected to the lamp. In the absence of AC input line voltage, the emergency ballast provides operating power to the lamp.

However, in conventional LFL fixtures, existing ballasts can be incompatible with some LED lighting assemblies. In such conventional systems, under battery backup conditions, many LED assemblies might not operate, or might not operate under proscribed standards set by occupational safety, electric code, and/or fire prevention organizations.

BRIEF DESCRIPTION OF THE DRAWINGS

FIGS. 5A-5B depict a printed circuit board for an LED EMBB lamp assembly in accordance with embodiments;

DETAILED DESCRIPTION

Figure 1:
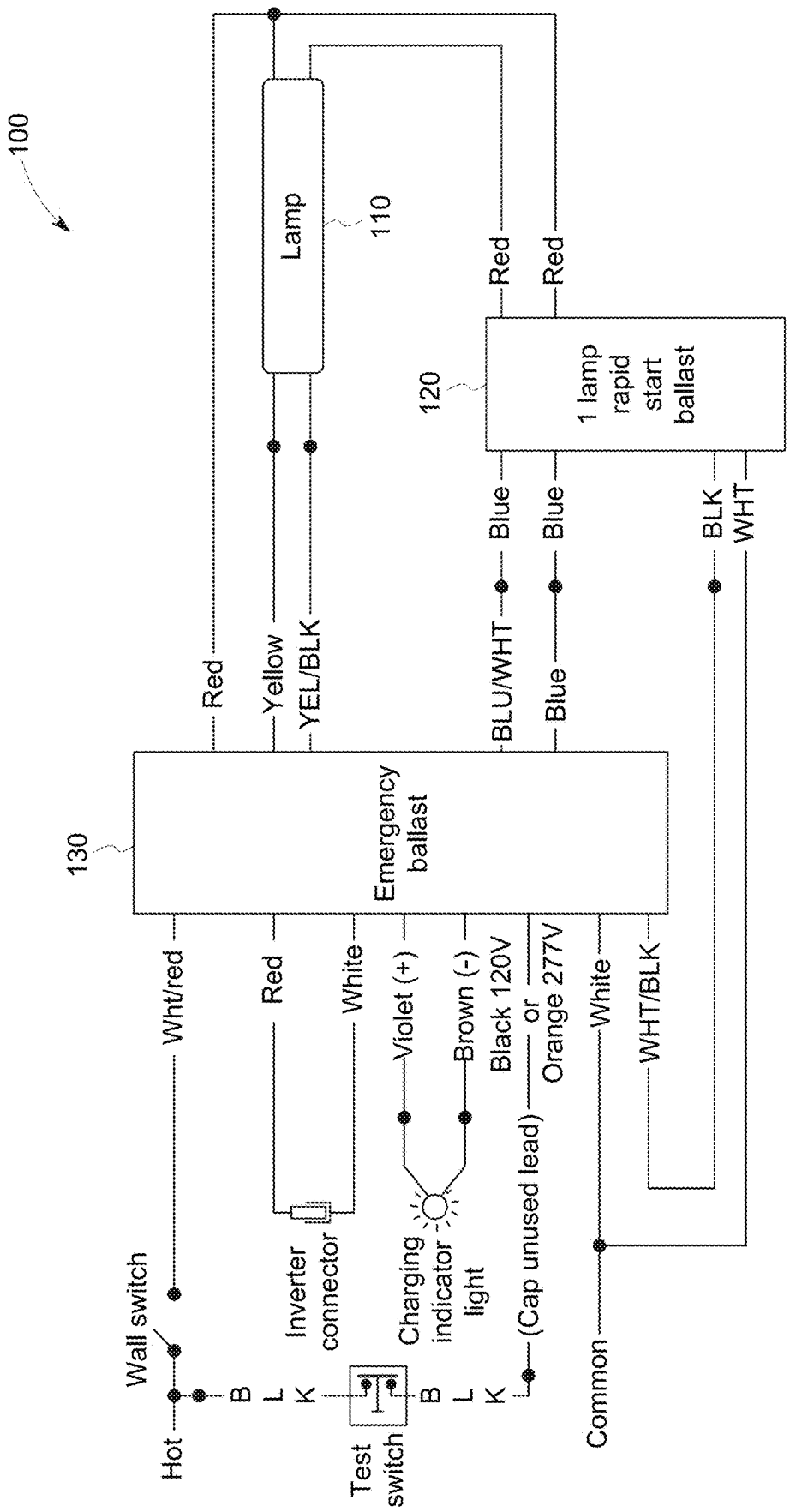
FIG. 1 depicts a wiring diagram for a conventional LFL emergency battery backup lighting system.
Figure 2:
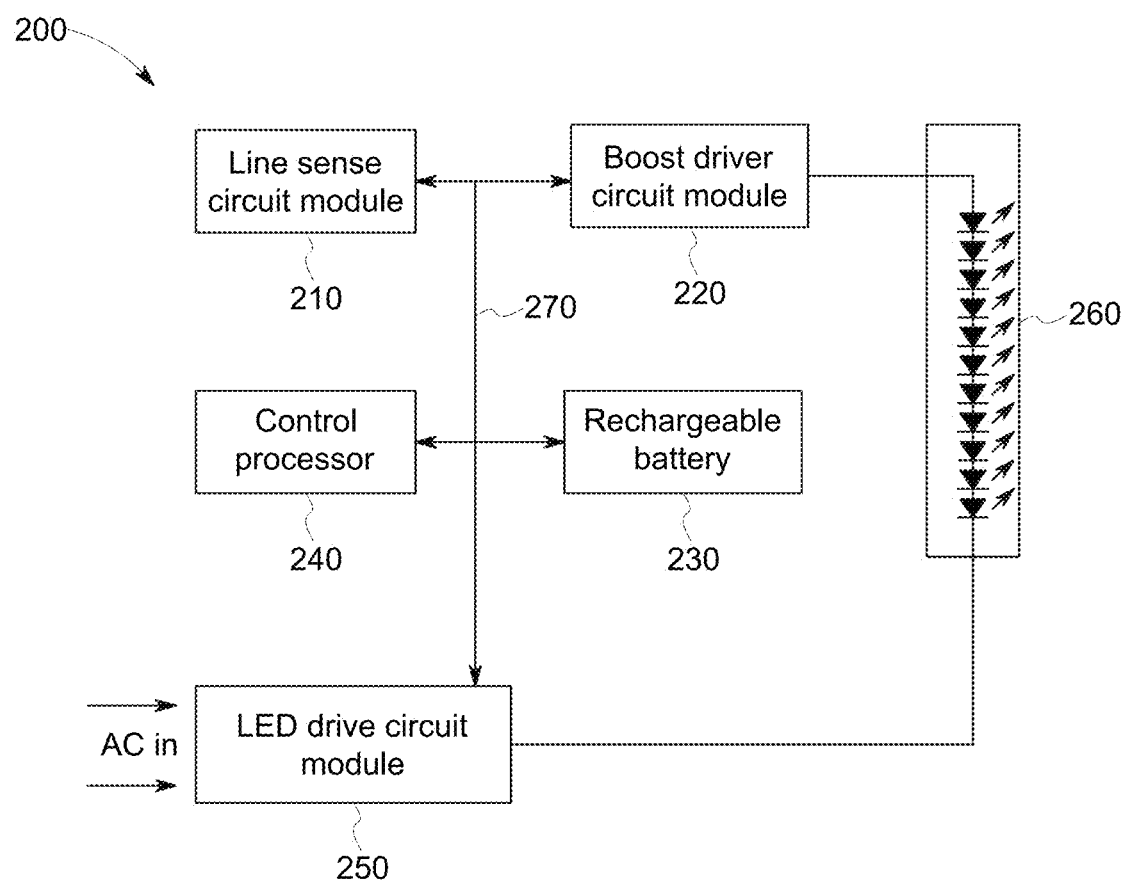
FIG. 2 depicts a block diagram of a LED EMBB lamp assembly in accordance with embodiments.

FIG. 2 depicts a block diagram of LED EMBB lamp assembly 200 in accordance with embodiments. LED EMBB lamp assembly 200 includes AC line sense circuit module 210, boost driver circuit module 220, rechargeable battery 230, control processor 240 (e.g., a microcontroller, microprocessor, ASIC, FPGA, etc.), a LED driver circuit module 250, LED light source 260, and data/control bus 270. As should be readily understood, the control processor can include, and/or is in communication with, memory containing executable instructions that the control processor can execute to perform disclosed monitoring and control functions. The components of an embodying LED EMBB lamp assembly can be packaged in a housing having a form factor equivalent to standard lamp form factors (e.g., Edison base, A19, A21, BR30, G13, T5, T8, etc.)

Figure 3:
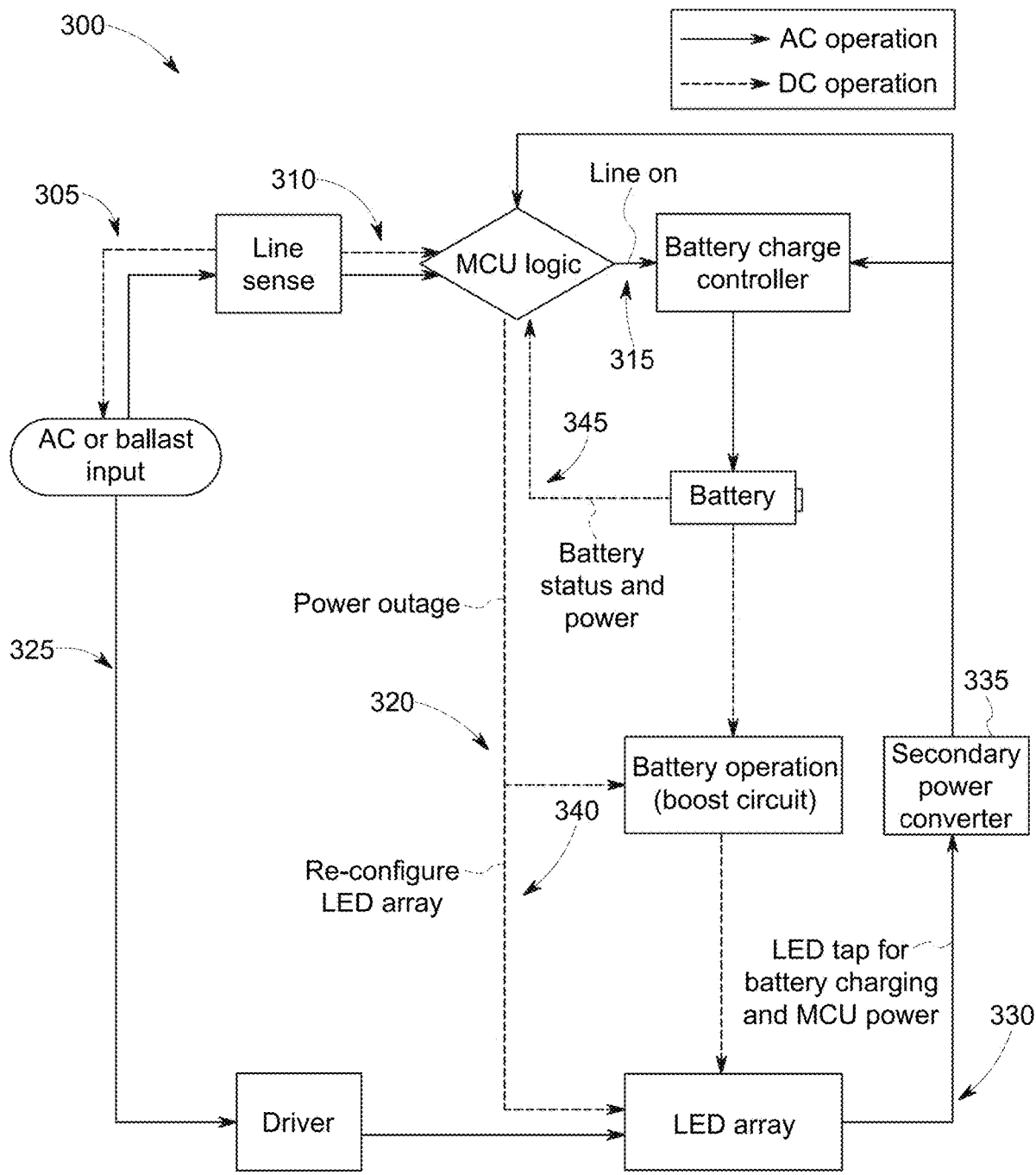
FIG. 3 depicts a state diagram for a LED EMBB lamp assembly in accordance with embodiments.

FIG. 3 depicts state diagram 300 for LED EMBB lamp assembly 200 in accordance with embodiments. The AC line sense circuit can monitor AC line signal 305 to determine the status of the input AC line voltage. The line sense circuit can provide AC status signal 310 as input to the control processor. If the AC line voltage is present, line-on signal 315 controls the battery charging operation. In the absence of input AC line voltage, the control processor provides line-off signal 320 to activate the boost driver circuit to use battery power to power the LED driver circuit. During operation in the presence of AC line voltage, the LED driver circuit is powered by the AC line voltage 325. The AC line voltage also provide power via LED tap 330 to charge the rechargeable battery and power the control processor. The LED tap voltage can be conditioned by secondary power converter 335.

In some implementations, the control processor can provide reconfigure signal 340 to switches that can turn on/off portions of the LED light sources. By reconfiguring the LED light source electrical configuration (i.e., series/parallel interconnections between light sources), the uniformity and evenness of the emitted light from the LED lamp can be maintained during battery power operation. Battery status/power signal 345 can be monitored by the control processor.

In accordance with embodiments, a conventional fluorescent lamp (e.g., an LFL), housed in a typical fluorescent light fixture of a conventional EMBB system, can be replaced within the LFL fixture with an embodying LED light assembly. Embodying LED EMBB lamp assemblies can replace a conventional fluorescent lamp while still complying with safety/backup lighting code requirements. In some implementations, it may be unnecessary to retain the emergency ballast.

An embodying LED EMBB lamp assembly can provide illumination automatically in the event of an interruption of AC line voltage due to at least any of the following: (1) failure of a public utility or other outside electrical power supply; (2) a circuit breaker or fuse tripping; and (3) manual act(s)—e.g., opening of a switch controlling normal lighting facilities.

Figure 4:
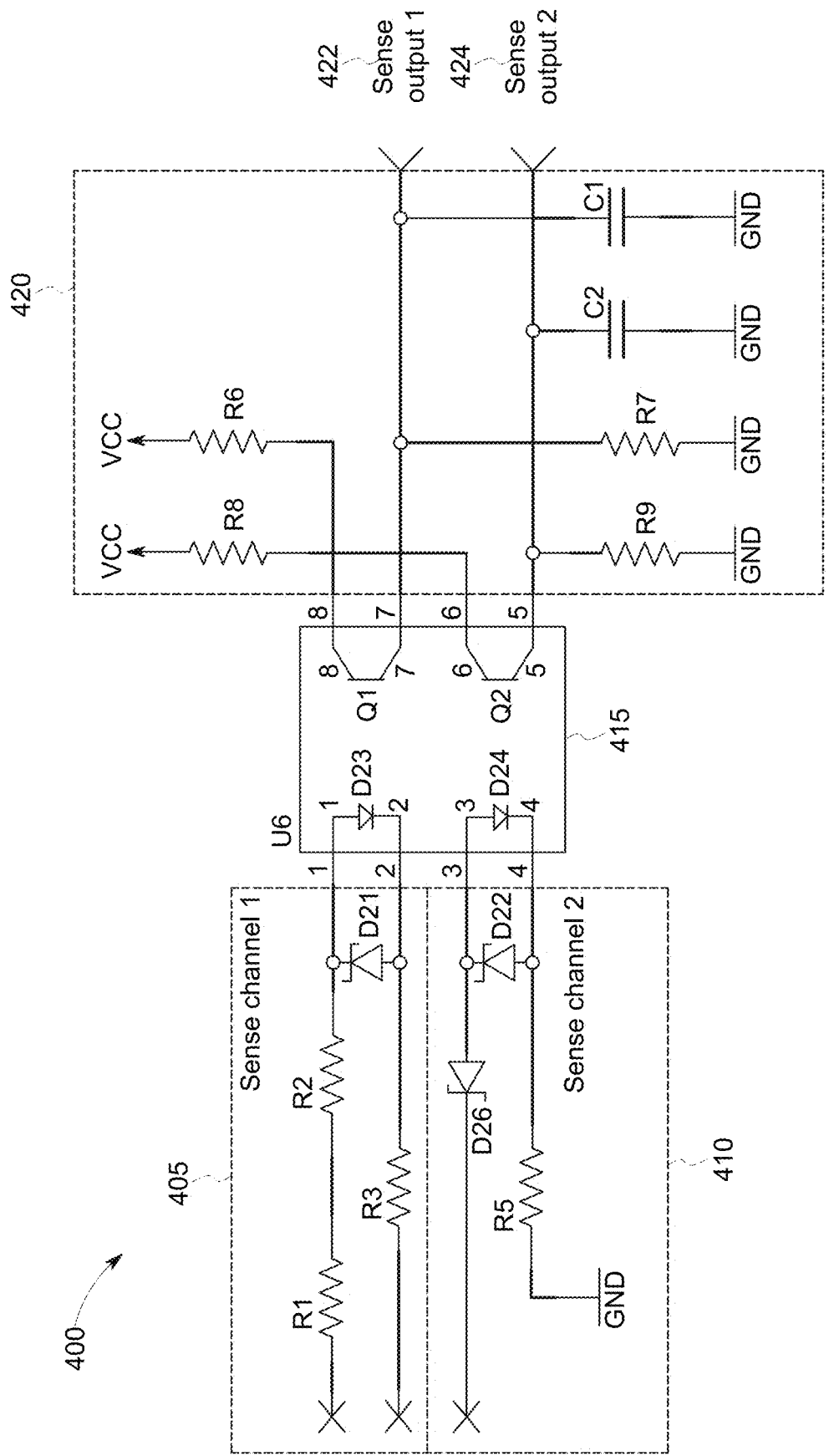
FIG. 4 depicts a line sense circuit in accordance with embodiments.

FIG. 4 depicts a schematic for embodying line sense circuit 400, which monitors the status of input AC line voltage in accordance with embodiments. Line sense circuit can include sense channel-1 405, and sense channel-2 410. Sense channel-1 monitors two-wire operation, and sense channel-2 monitors twenty-four hour/seven day (24/7) operation.

The sense channels are isolated from output stage 420 by isolator 415. Isolator 415 can be an integrated circuit optocoupler that includes photodiodes D23, D24 and phototransistors Q1, Q2. Isolator 415 provides isolation between the higher line voltage level input to the sense channels and the lower voltage levels of the monitoring and control processor stages. In accordance with embodiments, other types of isolators, isolation schemes, and/or circuitry are within the scope of this disclosure. The absence of power at the input to the LED EMBB lamp assembly can trigger one or more of sense output-1 (422) and sense output-2 (424).

FIGS. 5A-5B depict printed circuit board 500 for an LED EMBB lamp assembly in accordance with embodiments. The illustrated printed circuit board can include the LED EMBB lamp assembly elements on a single board. Line sense module 510 can include two channels, one for two-wire operation and one for twenty-four hour/seven day (24/7) operation. Boost module 520 can include a constant current LED driver with an integrated switch.

Battery protection circuit 560 can include low power switch 564, which can contain a common drain dual P-channel MOSFET. The low power switch can disconnect other modules of the LED EMBB lamp assembly (other than the control processor) to enable a low power sleep current (e.g., about 100 µA or less).

Linear regulator 568 can provide an ultra-low ground current to power the control processor. In some implementations the linear regulator can be a low dropout regulator (LDR) that can regulate its output voltage under conditions where the supply voltage is very close to the output voltage.

In accordance with embodiments, control processor 540 can include battery monitor 544. The battery monitor can be configured as a voltage divider that provides a signal to the control processor, which executes instructions to implement over/under voltage protection. The control processor can also include temperature monitor 548 that in some implementations can include a negative temperature coefficient (NTC) voltage divider to monitor battery temperature and thermal conditions.

Battery charge module 530 can include an integrated circuit to control the charging of rechargeable battery (or batteries) 230. The rechargeable batteries can be selected from several battery technologies, including lithium-ion batteries. The selection of the particular battery technology can be selected based on the particular form factor of LED EMBB lamp assembly being implemented, along with the power density (e.g., lumens and duration) needed to perform the required emergency lighting function.

In accordance with embodiments, printed circuit board 500 can include aperture 570. The size of aperture 570 is determined by the dimension of the battery, so that the battery can be inserted into the aperture, without passing through the aperture. This arrangement is used to reduce the overall cross-sectional profile of the printed circuit board.

In accordance with embodiments, secondary power module 550 can be implemented as a buck regulator to charge the batteries and provide operating power for the control processor during periods when the AC line voltage is not present.

In accordance with embodiments, in some implementations (e.g., a tubular LED lighting assembly is one example) the LED light source 260 might need to operate in the boost mode. In boost mode, the battery voltage can be stepped up to power the LED light source elements properly.

For example, driver electronics for a tubular LED lamp could need to provide about 90 V to provide an efficient system with low driver losses. The lower the LED tube voltage, typically the more difficult to get high efficiency. Additionally, for the LED EMBB lamp assembly to be a form-factor retrofit into an existing LFL fixture, the load mismatch to the LFL ballast would be difficult to resolve.

To reduce the 90 V forward voltage needed to drive the LED light sources, an embodying LED EMBB lamp includes a reconfigurable power circuit that can change the configuration of the internal interconnection of LED light sources between serial and parallel circuits.

Figure 6:
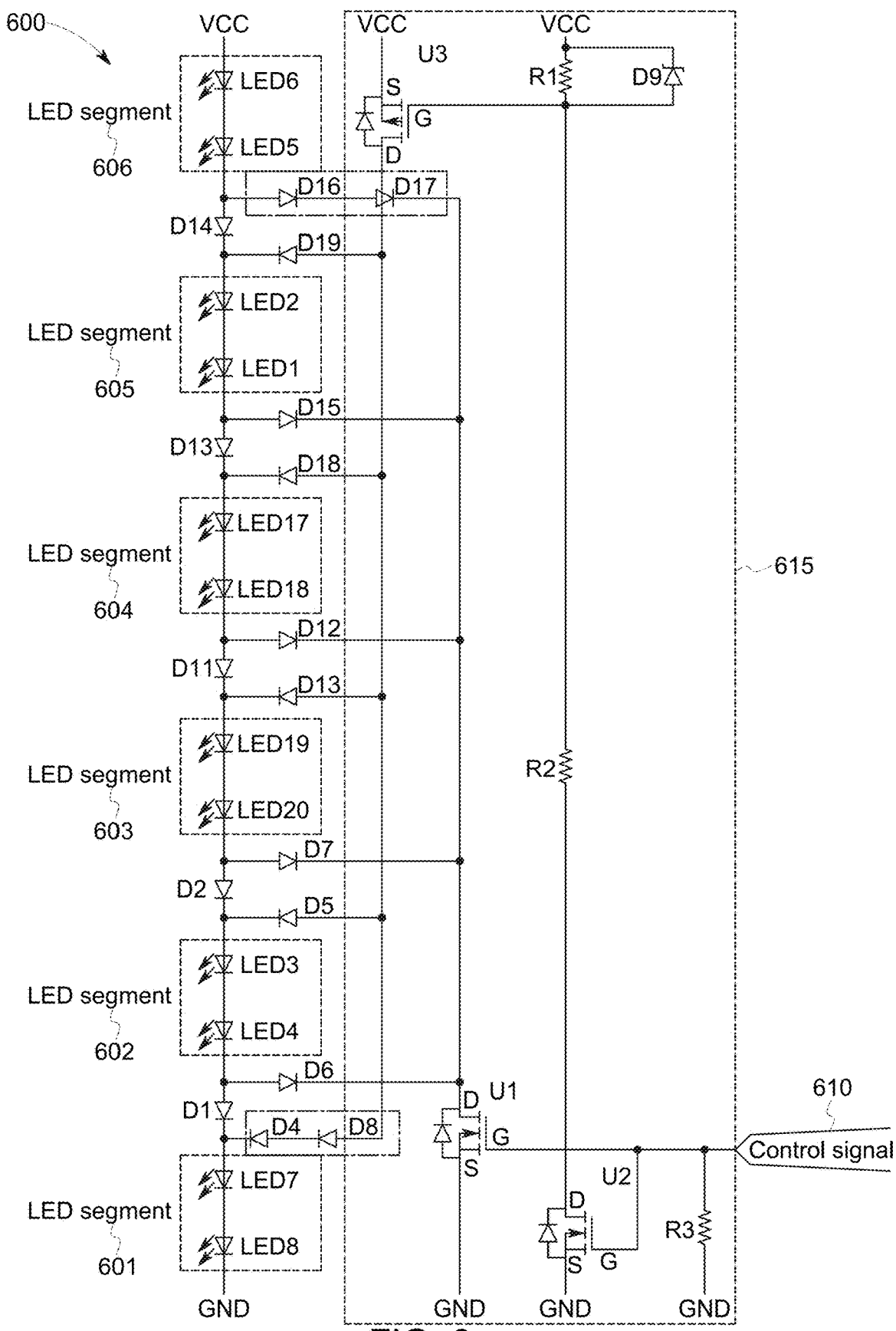
FIG. 6 schematically depicts a reconfigurable LED light source circuit in accordance with embodiments.

FIG. 6 schematically depicts reconfigurable LED light source circuit 600, which includes reconfiguration circuit 615 in accordance with embodiments. This reconfiguration circuit can reconfigure the interconnection of LED segments 601, 602, 603, 604, 605, 606 of LED light source 260. In a first configuration, the LED segments are electrically connected in series by diodes D1, D2, D11, D13, D14. Reconfiguration circuit 615 can change the electrical interconnection of the LED segments from series-to-parallel and/or parallel-to-series under control of a signal from the control processor in response to reconfigure signal 340. By reconfiguring the LED segment electrical interconnections, the overall LED string voltage can be reduced from its normal operating voltage by a factor in the range of about ½, ⅓, ⅙, 1/12, etc. By way of example, an embodying reconfiguration circuit can reduce the normal operating voltage of 90 V to about 15 V during battery-backup operations. This reduction in LED operating voltage can extend the period of illumination provided by the LED EMBB lamp assembly during battery power operation.

Reconfiguration circuit 615 can reconfigure the series interconnection between LED segments 601, 602, 603, 604, 605, 606 (operating serially at about 90 V under normal AC operation), to a parallel configuration (which can operate at about 15 volts—e.g., about twice the battery voltage). In accordance with embodiments, the LED light source can be reconfigured to present the same number of emitting LEDs having a reduced operating voltage load during battery operation.

Reconfiguration circuit 615 can be controlled by control signal 610 that is generated by the control processor (or another control circuit under control processor direction). The reconfiguration circuit can reconfigure interconnection of LED segments 601, 602, 603, 604, 605, 606 by switching MOSFETS U1, U2, U3 on and/or off.

In accordance with embodiments, MOSFET U1 can connect LED segments 602, 603, 604, 605, 606 to ground when switched to its on state. MOSFET U2 can control MOSFET U3. MOSFET U3 can connect LED segments 601, 602, 603, 604, 605 to supply voltage VCC. In some implementations, MOSFET U1, U2 can be N-FET transistors, and MOSFET U3 can be a P-FET transistor.

Schottky diodes D1, D2, D11, D13, D14 prevent reverse current through the LEDs when operating in parallel. Schottky diodes D8, D17 keep the forward voltages of the LED segments about equal.

MOSFET U3 controls the gate of MOSFET U2 because its potential is much greater than the normal 5 VDC (compared to ground) that the control processor can output. The reconfiguration circuit can be expanded to include more LED segments by adding three Schottky diodes per additional LED segment. MOSFET U1. The depicted implementation of reconfiguration circuit 600 can reduce the operating voltage of LED light source 260 by about ⅙.

The conventional approach to emergency battery backup LED operation is to reduce the number of LED light sources providing illumination during battery operation. However, this conventional solution results in a splotchy, uneven light distribution from the LED lamp. Embodying LED EMBB lamps provide a uniform illumination by reconfiguring LED light source serial connections to parallel connections as disclosed above.

In accordance with embodiments, an embodying LED EMBB lamp assembly can include a lamp housing that contains the components of the LED EMBB lamp assembly. For example, the LED driver electronics, line sense module, rechargeable battery, control processor, and other electronic components can be packaged into an endcap (a/k/a capper assembly) of the lamp housing.

Figure 7:
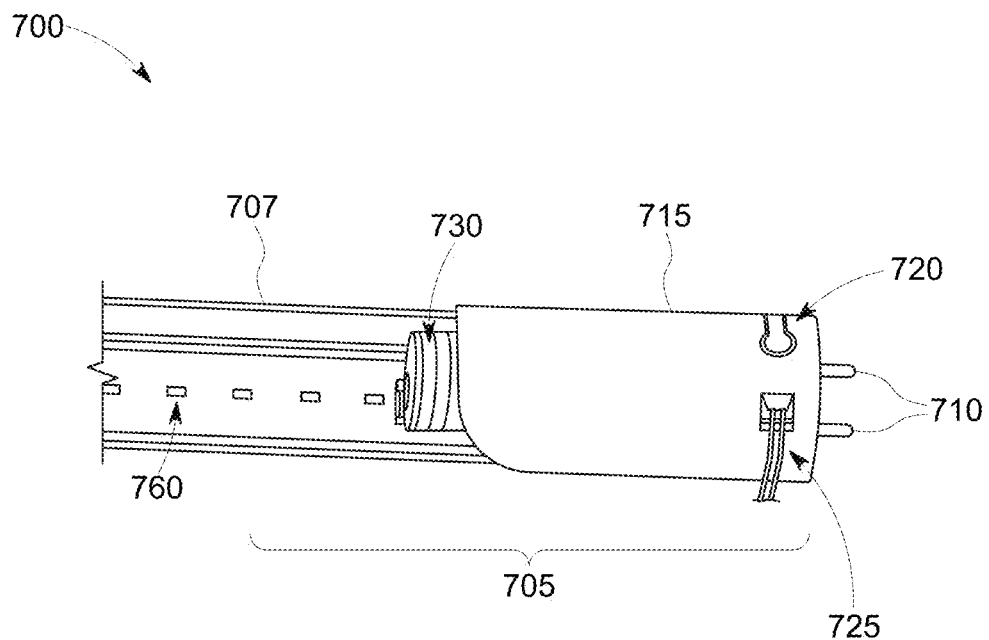
FIG. 7 depicts a cutaway view of an LED EMBB lamp assembly in accordance with embodiments.

FIG. 7 depicts a cutaway view of LED EMBB lamp assembly 700 in accordance with embodiments. Lamp housing 705 has a tubular form factor similar to a LFL tube. The housing includes optical portion 707 and endcap 715. The optical portion is transmissive (e.g., transparent, translucent, diffusing) for light emitted by LED light source 760.

AC line voltage terminals 710 can be configured as pins extending from endcap 715. The pins can be inserted into sockets in a conventional LFL fixture. In some implementations, these pins can be substituted with wire leads. The wire leads provide the ability to hardwire the LED EMBB lamp assembly to the LFL fixture, which will prevent the inadvertent replacement of the LED EMBB lamp assembly with either a LFL tube, or a conventional LED tube lamp.

In some implementations, endcap 715 can be extended in a direction distal from terminals 710 to cover rechargeable battery 730. Covering the rechargeable battery can prevent shadowing of the light generated by LED light source 760.

Test button 720 is located on an external surface of housing 705. Activation of the test button can initiate a self-test of the battery charge status. In some implementations, the self-test can cause the reconfiguration circuit to place the lamp in a reduced illumination state and cycle the boost circuit a predetermined amount. A green indicator light can be included to provide a visual test result. In accordance with embodiments, holding the test button for a set period of time (e.g., about 4 seconds) can initiate placing the LED lamp in a sleep/transport mode).

Input terminals 725 can be used to configure the LED EMBB lamp assembly in one of two operational modes—a 24/7 operational mode and a two-wire operational mode. In the 24/7 operational mode configuration no other external power connection is required other than an AC line input present at AC line voltage terminals 710. Upon line sense circuit module 210 detecting the absence of an AC line voltage at voltage terminals 710, the LED EMBB lamp enters its battery backup operation.

Figure 8A:
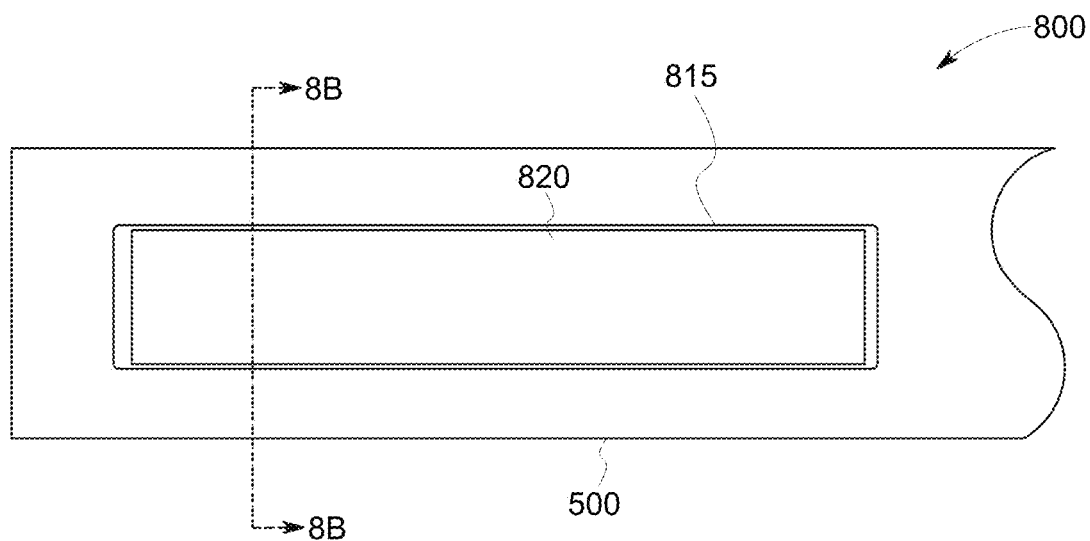
FIG. 8A depicts a partial view of the printed circuit board of FIGS. 5A-5B in accordance with embodiments.
Figure 8B:
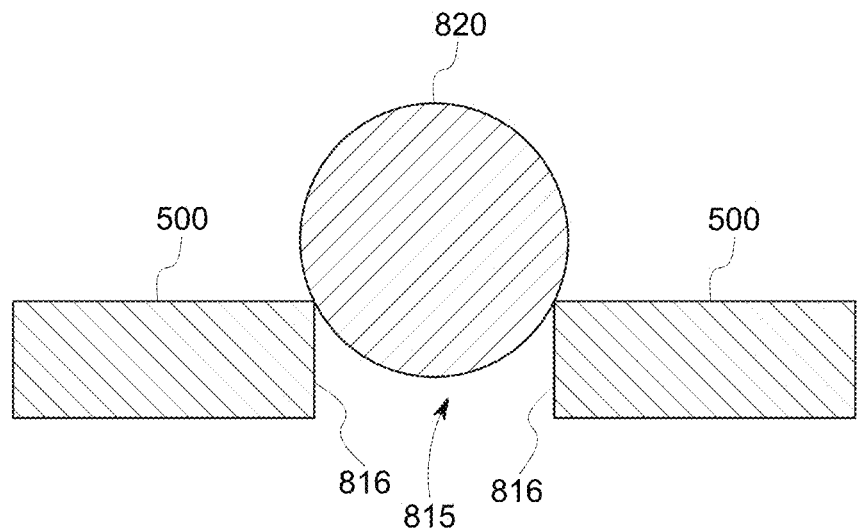
FIG. 8B depicts a cross section of the printed circuit board of FIG. 8A in accordance with embodiments.

FIG. 8A depicts partial view 800 of printed circuit board 500 in accordance with embodiments. FIG. 8B depicts a cross-section of the printed circuit board along line 8B-8B. Aperture 815 is defined by walls 816 extending through the printed circuit board to create the aperture. Battery 820 is partially located within aperture 815. This arrangement reduces the cross-sectional profile of the printed circuit board to fit within various lamp form factors.

Figure 9:
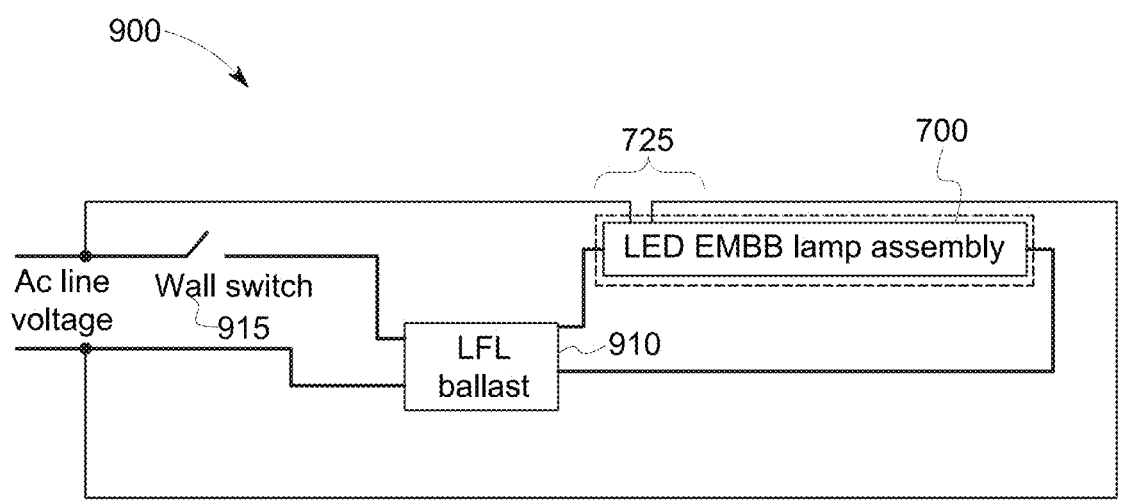
FIG. 9 schematically depicts operational mode installation options for an LED EMBB lamp assembly in accordance with embodiments.

FIG. 9 depicts two-wire operational mode installation schematic 900 for an embodying LED EMBB lamp assembly 700. In accordance with embodiments, the two-wire operational mode requires an AC line input present at AC line voltage terminals 710, and an always-on AC line voltage present at input terminals 725. For a tubular form factor, the lamp assembly can be installed in a conventional, existing LFL fixture. Connection of AC line voltage terminals 710 to LFL ballast 910 can be by insertion of pins extending from the endcap or by hardwire connection, as disclosed above.

Closure of wall switch 915 causes the LED light sources to emit illumination. Input terminals 725 are connected directly to AC line voltage source and neutral. Line sense circuit module 210 (within LED EMBB lamp assembly 700) can monitor the AC line voltage at input terminals 725. Absence of power at terminals 725 will trigger entry into battery backup mode.

In some embodiments, the LED EMBB lamp assembly can be configured to sense the presence/absence of the AC line input voltage via an RF monitoring device. The RF monitoring device can include a transmitter with terminals (e.g., outlet plugs) that are connectable to the AC line voltage. An RF receiver can be connected to input terminals 725. If the RF transmitter signals an AC line outage, the RF receiver can trigger a line sense circuit module to have the LED EMBB lamp assembly enter its battery backup mode. In some implementations, the RF receiver can be located within the lamp housing.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. An LED lamp comprising:
   a housing having an endcap, an optical portion, and a plurality of components located within the housing, the plurality of components including:
   an LED light source having a plurality of LED segments and a reconfiguration circuit;
   the reconfiguration circuit configured to route electrical connections among the plurality of LED segments from between a serial mode to a parallel mode of connection;
   an LED driver circuit configured to provide power to the LED light source;
   a line sense circuit configured to detect at least one of a presence and an absence of an AC line voltage;
   a rechargeable battery connected to a boost driver circuit, the rechargeable battery and the boost driver circuit configured to provide electrical power to the LED light source in the absence of the AC line voltage; and
   a control processor in communication with one or more other of the plurality of components across a data/control bus, the control processor executing executable instructions that cause the control processor to at least one of monitor and control the one or more other of the plurality of components.

2. The LED lamp of claim 1, including the housing having a form factor to fit into an existing lighting fixture.

3. The LED lamp of claim 1, including the LED light source providing an about uniform illumination intensity in both the serial and the parallel connection modes.

4. The LED lamp of claim 1, including the reconfiguration of the LED segment interconnections reducing an LED string voltage by a predetermined factor.

5. The LED lamp of claim 1, the plurality of components including a battery protection circuit having a low power switch configured to disconnect at least a portion of the plurality of components from a voltage supply.

6. The LED lamp of claim 1, the plurality of components including a linear regulator configured to provide an operating current to the control processor.

7. The LED lamp of claim 1, including at least a portion of the plurality of components mounted on a printed circuit board, the printed circuit board including an aperture defined by walls.

8. The LED lamp of claim 7, the plurality of components including a battery, the battery positioned at least partially within the aperture.

9. The LED lamp of claim 1, the plurality of components including a battery monitor configured to provide a signal to the control processor, the signal causing the control processor to execute instructions that cause the control processor to implement one of an over voltage protection operation and an under voltage protection operation.

10. The LED lamp of claim 1, the plurality of components including a temperature monitor configured to monitor battery thermal conditions, and provide a signal to the control processor in an out of tolerance condition.

11. The LED lamp of claim 1, the plurality of components including a battery charge module configured to provide a charge current to the rechargeable battery.

12. The LED lamp of claim 1, the plurality of components including a secondary power module configured to provide a charge current to the rechargeable battery and to provide operating power to the control processor during periods of AC line voltage absence.

13. The LED lamp of claim 1, including a test button located on an external surface of the housing, the test button configured to initiate a status self-test of the rechargeable battery.

14. The LED lamp of claim 13, including the self-test configured to cause the reconfiguration circuit to place the LED light source in a reduced illumination state and cycle the boost driver circuit a predetermined amount.

15. The LED lamp of claim 13, including the test button configured to cause the LED lamp to enter a sleep/transport mode.

16. The LED lamp of claim 1, including the line sense circuit having a two-wire operational mode configured to monitor an always-on AC line voltage at input terminals.

17. The LED lamp of claim 16, including the line sense circuit configured to provide a trigger to the control processor based on an absence of power at the input terminals, the trigger causing the control processor to control the LED lamp entry into a battery backup mode.

18. The LED lamp of claim 1, the line sense circuit including:
 a first sense channel configured to monitor a two-line voltage presence;
 a second sense channel configured to monitor an AC line voltage presence; and
 an isolator circuit configured to isolate the first and second sense channels from an output circuit;
 wherein the output circuit configured to provide a first sense output signal and a second sense output signal based on statuses of the respective first and second sense channel.

19. The LED lamp of claim 10, including, in response to the out of tolerance condition signal from the temperature monitor, the control processor configured to control the reconfiguration circuit to switch the LED segment electrical connections to the parallel mode.

20. The LED lamp of claim 1, including the LED light source having a parallel mode operating voltage that is in the range of about ½ to ¹⁄₁₂ of a series mode operating voltage.

* * * * *